INVENTORS
HENRY W. BABEL
ROBERT I. JAFFEE
BERNARD B. MOSS
BY Robert O. Richardson
— ATTORNEY —

United States Patent Office 3,380,146
Patented Apr. 30, 1968

3,380,146
CONTAMINATION BARRIER AND METHOD
Henry W. Babel, Northridge, Calif., Robert I. Jaffee, Columbus, Ohio, and Bernard B. Moss, Los Angeles, Calif., assignors, by direct and mesne assignments, of one-third to The Battelle Development Corporation, Columbus, Ohio, a corporation of Delaware, and two-thirds to McDonnell Douglas Corporation, Santa Monica, Calif., a corporation of Maryland
Filed Oct. 19, 1965, Ser. No. 497,719
10 Claims. (Cl. 29—423)

ABSTRACT OF THE DISCLOSURE

A roll-welding process wherein the cover sheets and spacer material used in the process may be mechanically, as well as chemically, removed from the structure that had been welded by this process. Those surfaces of the cover sheets and spacer material that are in abutment with the structure have a barrier opposing the migration of contamination from the sheets and spacer material into the material of the structure, thus providing for easier separation of the structure from the cover sheets and spacer material after heat and pressure have been applied. In one embodiment a high carbon content in steel cover sheets and spacer material becomes a barrier opposing migration of iron into titanium structures during the roll-welding process.

---

The roll-weld process is a method of uniting two materials during a hot rolling operation into an autogenous weld in the solid state under heat and pressure. The two parts to be welded are positioned in abutting relationship within a surrounding frame of another material and the remaining space within the frame is filled with a filler material so as to provide for a pack having no void spaces therein. Cover sheets are then welded to the opposite sides of the frame and air is evacuated from the pack. After the pack is subjected to suitable heat and pressure, in order to roll-weld and thus unite the two parts, the cover sheets and the frame are removed, as well as the filler bars. This roll-weld process is more fully disclosed in a Patent Number 3,044,160 entitled Method of Producing Ribbed Metal Sandwich Structures. This patent was issued July 17, 1962, to R. I. Jaffee.

A basic consideration in the roll-weld process is the prevention of contamination of the material to be roll-welded. This material hereinafter will be referred to as a parent material, and usually is a difficult-to-weld material such as a beryllium or titanium alloy. This contamination may result from gaseous elements if the pack is not sufficiently evacuated. It also results from the diffusion of the filler material, and material from the surrounding frame and cover sheets, into the parent material under the temperature and pressure used during the roll-welding process. Material for the filler, frame and cover sheets, collectively described as surrounding material, is not the same as the parent material forming the bonded structure. While contamination of the surface of the parent material is not so difficult a problem when the parts are thick, it is a source of failure when very thin parts are welded together. Likelihood of failure occurs when sufficient diffusion, activated by the heat and pressure of the roll-welding process, takes place into the parent material from the surrounding material to cause a local change in composition of the parent material. The new composition generally has characteristics less desirable than those sought in the compostion of the material of the final product. For instance, sufficient change in composition of the diffused zone may cause a local phase transformation to a phase having brittle characteristics. This would favor formation and propagation of cracks into the parent material. In these structures surface contamination cannot be tolerated.

Prior to the present invention, methods were available to prevent contamination or to minimize its effects. The former methods usually were only partially successful and the latter did not eliminate the initial contamination. A method used for roll-welding of titanium having surrounding material of iron required minimizing the length of time the roll-welded pack was subjected to pressure at an elevated temperature above 1500° F. This approach can minimize the depth of the interface layer containing diffused iron but never has completely inhibited its formation. A method of minimizing the effects of diffusion consists of using thicker structures and removing the contaminated layer by mechanical or chemical means. However, the complexity of the geometry of many configurations produced by the roll-welded process has prevented the use of mechanical removal methods and has not permitted the effective use of chemical removal techniques. In addition, the latter techniques contribute significantly to the cost of the roll-welding process. Still another consideration incidental to the problem of contamination by diffusion interaction is in the economical removal of the cover sheets and filler material from the finished welded structure after the roll-weld process has been performed. As previously noted, conditions favorable for autogenous welding of the structural materials enhance atomic interaction of surrounding material with the structural materials. It will be apparent that when this occurs the different materials are not readily disassembled mechanically.

Cover sheets frequently may be removed by mechanical means, such as by a sharp mechanical blow on the edge of the cover sheet, to separate the encasing cover sheet from the facing sheet material. It was noted in practice that when strong bonding between the cover and the facing sheet was obtained, the bond between the cover sheet and the encasing material could not be easily broken by mechanical means, and chemical removal was required. On the other hand, when a bond of insufficient strength existed between the facing sheet material and the encasing cover sheets, they would separate during the roll-welding process which frequently results in rupturing of the vacuum seal weld, and substantial oxygen contamination of the parent material would occur, requiring extensive pickling afterwards. In practice, the problem thus becomes one of how to accomplish bonding between the structural materials and minimize diffusion interaction between the dissimilar materials.

As is now well known in other applications, the roll-weld process is used in making many configurations, typical of which is a high strength light-weight sandwich consisting of spaced face plates of parent metal, such as titanium or beryllium, with parent metal strips alternately spaced inbetween with a suitable filler material such as copper or steel. This filler material is then removed after the roll-weld process has integrally bonded the strips to the face plates. Whereas cover plates are generally amendable to mechanical removal, the same is not always true for filler bars. In complex configurations supported, say, by longitudinal and transverse or arcuate members, chemical leaching is used to remove filler material. Mechanical removal of filler bars is feasible in the less complex configurations and particularly in those where a top face plate is omitted from the pack so as to produce a stiffened skin structure. To facilitate mechanical removal, the interdiffusion of the filler material and the parent metal must not be excessive. Ideally, a surface between the parent metal and the filler material with a controllable brittle characteristic has been sought to facilitate mechanical fracture at the interface region, thereby permitting the mechanical separation of the filler material from the parent metal. Of course, this must be done in such a manner that the chemical composition and the physical properties of the parent metal are not affected.

One example of this invention may be found in the fabrication of titanium alloy structures by the roll-weld process. Processing procedures used for the production of titanium alloy structures by the roll-weld process invariably produce a diffusion layer of iron into the surface of the titanium alloys. This contaminated layer must be removed or the structure produced must be scrapped because the quality of the fabrication has become impaired by this diffusion. Failure to either prevent such contamination or to incompletely remove such a contaminated layer may result in the failure of the structure when used in the construction of a component. In the roll-weld process, titanium alloys usually are in intimate contact with low carbon steel at elevated temperatures and are subjected to high pressures during the rolling operation. These conditions lend themselves to the diffusion of iron into the titanium alloys. The contaminated layer varies in depth with the rolling temperature and the exposure time.

It is therefore an object of this invention to provide for a new and improved method of removal of cover sheets and filler material surrounding parts that have been roll-welded together.

Another object is the provision for the method of removal of steel cover sheets and filler bars used in the roll-welding of titanium alloy structures.

Another object is the provision of a method of controlling the surface between two materials to selectively provide for and/or prevent the formation of a barrier between the two surfaces, thereby to obtain a bond or to permit mechanical separation of the two materials after exposure to a welding environment.

Another object is the provision of a method of controlling the characteristics of the abutting surface of one of two abutting materials subjected to a welding environment whereby said materials may be separated by mechanical means and wherein the chemical composition and physical properties of the other material are not adversely affected.

Another object of this invention is to provide a means for preventing the diffusion of iron or other contamination into titanium and its alloys when steels and titanium, or titanium alloys are in contact at elevated temperatures under static or dynamic (roll-welding) pressure conditions.

These and other objects will become more apparent as a description of this invention proceeds, having reference to the drawings wherein.

Titanium alloys represent a class of high strength, corrosion resistant, light-weight metals which are extensively used in the aerospace industries. An important feature of titanium alloys is the fact that they are approximately 44% lighter than steel at the same strength level. On a strength-to-density ratio these alloys are better than all but a few specialty steels used for unmanned missiles. Titanium is resistant to atmospheric and salt water corrosion and under most conditions compatible with the fuels and oxidizers used for current liquid propelled vehicles. In addition, titanium can be used over a very broad temperature range, ranging from $-423°$ F. required for cryogenic tankage used in space boosters, to above $800°$ F. experienced on high performance aircraft.

Titanium alloy sheet can be fabricated into useful structures employing current technology. However, there is a basic problem in producing joints with the same structural integrity as the parent material. Moreover, the cumbersome technique and inaccessibility of the joint areas make the process costly and time consuming. This problem is accentuated by many of the geometries required for current and advanced missile and space vehicles. In order to provide the required stiffness and buckling resistance to the thin gauge titanium sheet, a rib stiffened skin or sandwich is used. In either case, the ribs have been joined to the sheet by riveting, spot welding, or fusion welding. However, these joints lack the same strength and microstructure as the parent metal. A roll-weld process has been developed to solve this problem and is described in the Jaffee patent previously mentioned.

Figure 1:
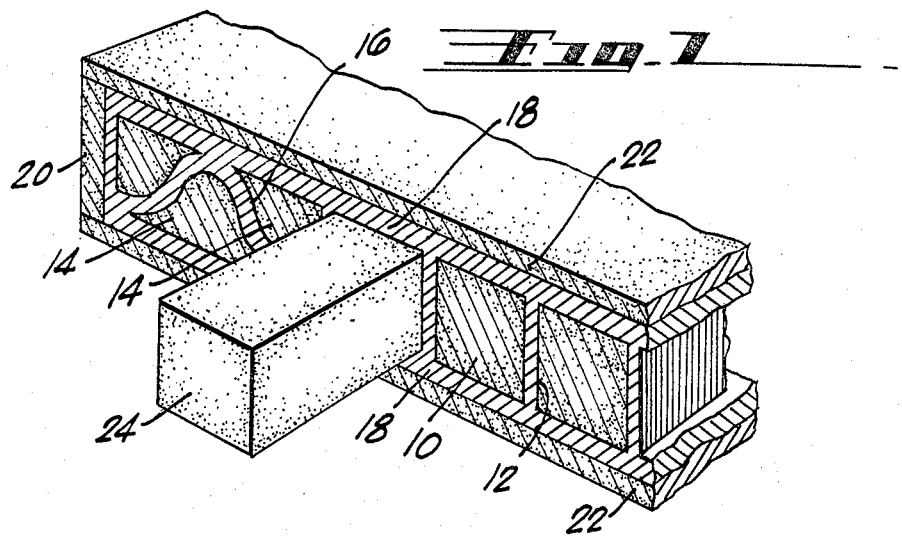
FIGURE 1 is a perspective view, partly broken and in section, showing a pack of roll-welded structure with one of the filler bars partly removed.

A basic part of the roll-weld process is the use of steel filler bars, yokes, and cover sheets to support and protect the titanium structure during the rolling operation. A typical pack design is shown in FIGURE 1. The steel filler bars 10 are used to support the thin titanium ribs 12 or filler bars 14 of complementary design to support corrugations 16 between face sheets 18 of titanium. A picture frame yoke 20 and cover sheets 22 are used to provide a leak tight envelope around the titanium. The interior of the pack is evacuated prior to heating to prevent oxygen contamination of the titanium during the heating cycles for rolling and during the rolling operation. After rolling, the yokes 20 may be sheared or sawed off the pack while the steel cover sheets 22 and filler bars 10 and 14 are removed by other techniques.

As mentioned above, steel has found wide use as the material for the filler bars, yokes and cover sheets to support a structure of titanium undergoing roll-welding. Steels have been used indiscriminately with respect to their carbon content. This includes low, medium and high carbon steels. As used herein, low carbon content is less than 0.15 percent of carbon; medium carbon content includes the range from 0.15 to 0.65 percent of carbon; and high carbon content is greater than 0.65 percent of carbon. It has now been discovered that the level of carbon in the steel immediately adjacent the titanium undergoing roll-welding affects the interface characteristics of adjacent materials. By proper control, the ideal condition can be achieved wherein a minimum diffusion bond is provided capable of holding the assembly together during fabrication without being characterized by excessive diffusion. In other words, a controllable interface characteristic is provided to enhance the roll-welding operation. It has been discovered that the carbon content of steel adjacent to titanium should be controlled to 0.15 to 0.95 percent of carbon, and preferably within the range of 0.40 to 0.95 percent of carbon. When composition at the adjacent steel surface is less than 0.15 percent of carbon, such as in decarburized steel, a strong bond between the steel and the titanium occurs, but with a resulting contamination of iron into the titanium. This led to the discovery that the amount of carbon content at the surface of the steel affected the degree of iron contamination of the titanium and also the strength of any bond between the two. It was further discovered that the range of carbon content at the surface of the steel that would practically eliminate iron contamination of the titanium and that required to obtain easy mechanical removal of the steel members from the titanium coincide with 0.40 percent and higher. When the carbon content at the surface of the steel is between 0.15% C and 0.40% C, the bond between the steel and the titanium is strong. Under carefully controlled processing conditions the contamination by iron may be small. When the carbon content at the surface of the steel is less than 0.15% C, the bond is strong but the amount of iron contamination is excessive. Thus the carbon content at the surface of the steel should be above 0.40% C to avoid excessive iron diffusion and permit easy separation of steel from titanium. The use of steel with surface carbon in this range greatly widens the permissible processing limits. By thus controlling the amount of surface carbon of the steel members comprising the cover sheets and filler material, the interfacial strength between the steel and titanium may be controlled to thus control the surface contamination of the titanium and also to permit mechanical separation of the steel cover sheets and filler bars from the titanium. When the surface carbon level of the steel filler bars is above 0.40% C a surface barrier is presented which retards the contamination of the titanium.

It can be seen that adherence to the proper range of carbon content permits the cover sheets and filler bars to be mechanically removed. Any technique that is mechanical in nature may be used to break the steel loose from the titanium. This may include mechanical rapping, vibrating the entire pack, application of tension to the filler bars, and other mechanical techniques. Removal of the filler bars may be accomplished by pushing or pulling with the hand or power equipment. Filler bar 24 is shown partially removed in this manner.

In the making of filler bars which fill the roll-weld pack between the portions of parent material to be welded together, the filler bars are shaped by machining, cutting, grinding or by a drawing or extrusion process. It has been found that when steel filler bars of medium or high carbon content are cut, the exposed new surface retains this carbon content but that when the drawing or extrusion process is used, the carbon content at the newly formed surface has been reduced or decarburized. Thus, a "resurfacing" of the low carbon content surface must be done before the filler bars may be used in the roll-weld pack. There are several satisfactory techniques for carbonizing the surface such as carbon coating, plating, chemical or electrical deposition, etc., all known methods used in the steel industry for other purposes, and therefore further details are not believed to be necessary herein.

Figure 2:
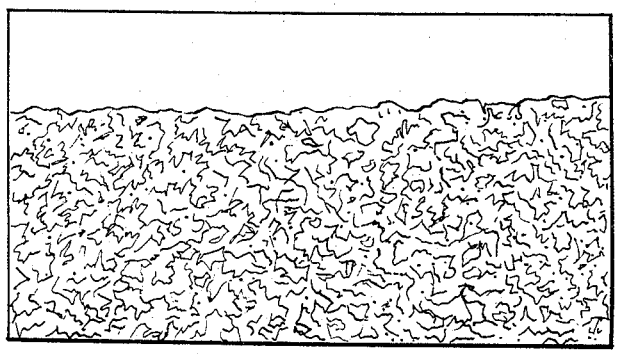
FIGURE 2 is an enlarged reproduction of a photomicrograph showing the appearance of the surface of a titanium alloy material when there is no contaminant present.
Figure 3:
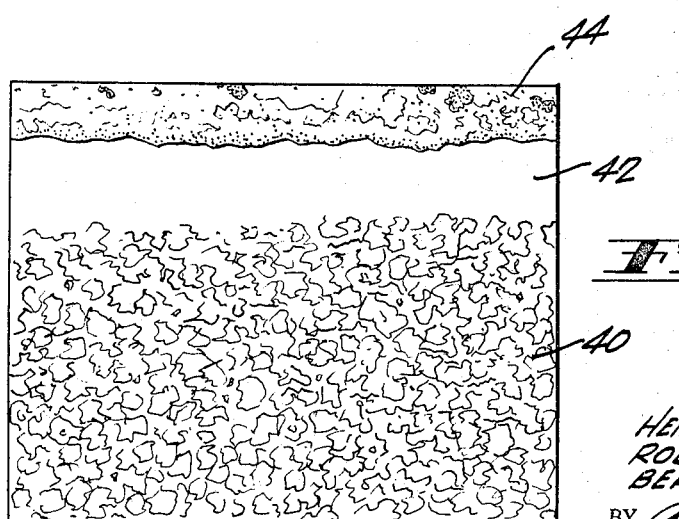
FIGURE 3 is a similar view showing a contaminated surface.

FIGURE 2 shows the appearance of a titanium alloy 30, known as Ti-6A1-4V, magnified 500 times, when there is no contamination present and FIGURE 3 shows the same material 40 with a contaminated titanium surface 42 resulting from welding to a low carbon content steel 44. This surface of contamination may be on the order of 0.005 inch thick and must be removed before the titanium may be used. The cost to the titanium industry of this removal amounts to millions of dollars yearly.

While an embodiment utilizing the present invention has been described wherein steel filler bars, yoke and cover plates are used in a roll-weld pack for the roll-welding of titanium, and wherein the surface of the steel has a carbon content of 0.40% C or higher, it is believed that the present invention need not be restricted thereto. For example, this invention is applicable in areas other than in roll-welding, such as in the production of titanium sheet to prevent an undesirable iron diffusion layer which otherwise must be removed. This invention, in its broader aspects, may be used with all materials which may be roll-welded. Among others, these include beryllium, beryllium-aluminum alloys, TD nickel alloys, RENE 41, Columbium stainless steel, Inconel, molybdenum, tungsten and tantalum. This invention may also be used in welding processes other than the roll-welding process, where it is desired that two or more parts be subjected to a given environment and that these parts either become welded together or not welded and free from contamination as the case may be.

The underlying principle behind all these embodiments is in the proper control of interface characteristics of adjacent materials to prevent or permit the bonding together of these materials. This permits the preparation or utilization of the surface of a contact material to establish a diffusion barrier with the abutting parent material, whereby the latter does not diffuse excessively thereto under conditions wherein adjacent parts of parent material do become strongly roll-welded together. Whereas when steel is used as the contacting material, a surface diffusion barrier is formed when the steel has a carbon content of 0.40% C or greater at its surface, it is believed that metallurgical technology will provide suitable diffusion barriers for other combinations of contact material and parent material. It is also believed that, in view of the present invention, the surface of contact materials may be so treated such that they also may provide a strong bond with the parent material when such a weld is desired.

Having thus described an embodiment of the present invention, it is expected that those skilled in the art will become aware of alterations and modifications thereof, and it is intended that these deviations be considered as part of this invention insofar as they may be embraced within the appended claims.

We claim:

1. In the method of roll-welding of titanium parts comprising the steps of assembling said titanium parts to be welded with portions in abutting relationship in a steel yoke, filling voids within said steel yoke with a steel spacer material, sealing said steel yoke with steel cover plates to form an envelope about said titanium parts and withdrawing air therefrom, heating and rolling said envelope and contents until an autogeneous weld is made between abutting portions of said titanium parts, and selectively removing said spacer material, said yoke and said cover plates from said titanium parts, the improvement of:

employing a steel yoke, steel cover plates and steel spacer material containing an amount of carbon along their surfaces in abutment with said titanium parts that is sufficient to form a barrier between said steel and titanium surfaces to thereby minimize contamination of said titanium surfaces by diffusion of iron into said titanium surfaces and allow mechanical removal of said spacer material, said yoke and said cover sheets from said titanium parts, and mechanically removing said cover sheets, yoke, and spacer material.

2. The method as in claim 1 wherein said steel has a carbon content of between 0.40% C and 0.95% C at the abutting surface thereof.

3. In the method of roll-welding of parts of a metal selected from the class consisting of titanium, beryllium-aluminum alloys, nickel alloys, columbium, stainless steel, molybdenum, tungsten and tantalum comprising the steps of assembling said parts to be welded with portions in abutting relationship in a steel yoke, placing steel spacer material within said steel yoke adjacent said parts to be welded, sealing said steel yoke with steel cover plates to form an envelope about said titanium parts and withdrawing air therefrom, heating and rolling staid envelope and contents until an autogeneous weld is made between abutting portions of said parts, and selectively removing said spacer material, said yoke and said cover plates from said parts, the improvement of:

employing a steel yoke, steel cover plates and steel spacer material containing an amount of carbon along their surfaces in abutment with said parts that is sufficient to form a barrier between said steel and surfaces of said parts to thereby minimize contamination of said surfaces by diffusion of iron into said surfaces and allow mechanical removal of said spacer material, said yoke and said cover sheets from said parts, and removing said cover sheets, yoke, and spacer material.

4. The method as in claim 3 wherein said steel has a carbon content of between 0.40% C and 0.95% C at the abutting surface thereof, which constitutes said diffusion barrier.

5. A roll-weld pack consisting of a yoke, top and bottom cover sheets and filler material, parts to be welded together under suitable heat and pressure in abutting contact with each other, said filler material being placed around said parts to thus fill said pack, said yoke, top and bottom cover sheets and filler material being of steel and having diffusion barrier surfaces of a carbon content with a range of 0.40% C and 0.95% C adjacent said parts to prevent migration thereto of contamination therefrom.

6. The process of making sheets of titanium comprising the steps of:
   placing titanium material between cover sheets of steel with abutting surfaces thereto having a diffusion barrier to prevent migration of contamination from said steel into said titanium material,
   heating said material to suitable temperatures and rolling said material under suitable pressure to reduce said titanium material to a sheet of a desired thickness, and
   thereafter mechanically removing said cover sheets from said titanium sheet.

7. The process of making sheets of titanium as in claim 6, wherein said steel sheets have surfaces in contact with said titanium, which surfaces have a carbon content within the range of 0.40% C and 0.95% C.

8. In the method of roll-welding titanium parts together comprising the steps of assembling said titanium parts between steel cover plates, placing steel spacer material between said cover plates and adjacent to said titanium parts, heating and rolling said assembly until a weld is made between adjacent portions of said titanium parts, and selectively removing said cover plates and spacer material, the improvement of:
   employing steel filler material containing an amount of carbon along the surfaces thereof which are adjacent said titanium parts that is sufficient to form a barrier at the steel surfaces which are adjacent to the titanium parts to thereby minimize contamination of the surfaces of said titanium by diffusion of iron from said filler material into said titanium surfaces, and removing said spacer material.

9. In the method of roll-welding together parts of a metal selected from the class consisting of titanium, beryllium-aluminum alloys, nickel alloys, columbium, stainless steel, molybdenum, tungsten and tantalum comprising the steps of assembling said parts to be welded between steel cover plates, placing steel spacer material between said cover plates and adjacent to said titanium parts, heating and rolling said assembly until a weld is made between adjacent portions of said titanium parts, and selectively removing said cover plates and spacer material, the improvement of:
   employing steel filler material containing an amount of carbon along the surfaces thereof which are adjacent to said titanium parts that is sufficient to form a barrier at the steel surface which is adjacent to the titanium parts to thereby minimize contamination of the surfaces of said titanium by diffusion of iron from said filler material into said titanium surfaces, and removing said spacer material.

10. The process of making sheets of titanium comprising the steps of:
    placing titanium material between cover sheets of steel with abutting surfaces thereto having a diffusion barrier to prevent migration of contamination from said steel into said titanium material, said diffusion barrier consisting essentially of an amount of carbon along the surface of said steel adjacent said titanium material that is sufficient to form said barrier at the steel surfaces adjacent to the titanium material;
    heating said material to suitable temperatures and rolling said material under suitable pressure to reduce said titanium material to a sheet of a desired thickness; and
    thereafter removing said cover sheets from said titanium sheet.

References Cited
UNITED STATES PATENTS

| | | | |
|---|---|---|---|
| 2,159,043 | 5/1939 | Orr | 29—470.9 |
| 2,423,810 | 7/1947 | Goulding | 29—423 |
| 2,438,759 | 3/1948 | Liebowitz | 29—424 |
| 2,851,770 | 9/1958 | Fromson | 29—423 |
| 2,908,969 | 10/1959 | Wagner | 29—470.9 |
| 2,932,885 | 4/1960 | Watson | 29—470.9 |
| 3,044,160 | 7/1960 | Jaffee | 29—423 |

THOMAS H. EAGER, *Primary Examiner.*